United States Patent [19]

Rogers

[11] 4,346,662
[45] Aug. 31, 1982

[54] SELF-CONTAINED BACKFLUSH/START SYSTEM FOR SUCTION LFC UNDERSEA VEHICLE

[75] Inventor: Kenneth H. Rogers, Corona, Calif.

[73] Assignee: The United States of America as represented by the Secretary of the Navy, Washington, D.C.

[21] Appl. No.: 147,440

[22] Filed: May 7, 1980

[51] Int. Cl.³ ................. F42B 19/00; F42B 19/26
[52] U.S. Cl. ..................... 114/20 R; 114/67 R; 114/337
[58] Field of Search ............ 114/67 A, 67 R, 20 R, 114/337; 244/203, 207, 208

[56] References Cited

U.S. PATENT DOCUMENTS

| | | | |
|---|---|---|---|
| 2,078,854 | 4/1937 | Jones | 244/208 |
| 2,969,759 | 1/1961 | Giles | 114/67 A |
| 3,604,661 | 9/1971 | Mayer, Jr. | 244/207 |

Primary Examiner—Sherman D. Basinger

[57] ABSTRACT

A clean start backflush system provides a mode of operation in a suction laminar flow control (LFC) vehicle in which low speed propulsion and backflush through surface apertures are simultaneously generated. The propulsion assists the transition from an at-rest state to the desired high-speed travel, while backflush in the low-speed regime ensures that ocean particles are not captured at the entrance to the flush suction slots.

12 Claims, 3 Drawing Figures

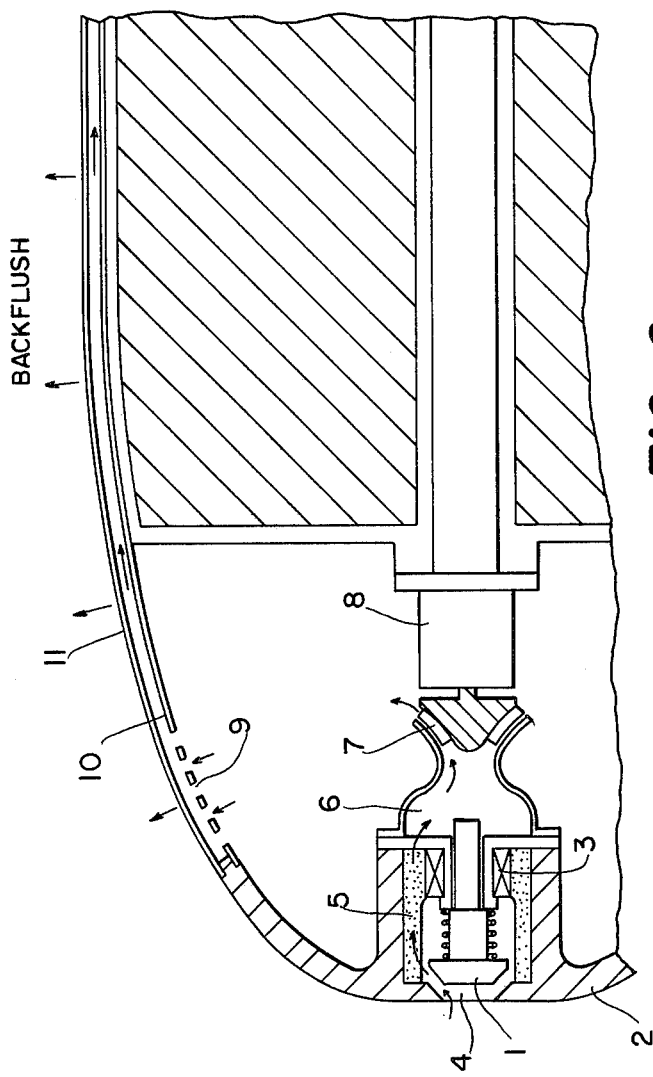
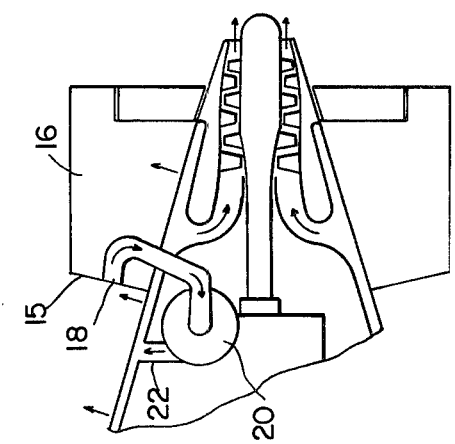

SELF-CONTAINED BACKFLUSH/START SYSTEM FOR SUCTION LFC UNDERSEA VEHICLE

BACKGROUND OF THE INVENTION

The present invention relates to the propulsion of undersea vehicles and especially to a propulsion system for such vehicles which, in its low speed mode, combines backflushing with propulsion.

When an undersea vehicle such as a torpedo travels through the ocean, surface friction creates a boundary layer of retarded fluid next to its surface. The boundary layer at the extreme forward region of the vehicle nose is smooth and "laminar" in character, but quickly changes to "turbulent" as the flow progresses rearward from the nose. Thus, nearly all of the vehicle boundary layer is normally turbulent. The friction or drag of a turbulent boundary layer is seven to ten times that of a laminar boundary layer, so the possibility of achieving drastic reductions in vehicle drag and power by maintaining a laminar boundary layer is an attractive challenge for the engineer and scientist. The principle of maintaining laminar flow by surface suction applied through many fine circumferential slots on a very smooth body of revolution has been demonstrated in a wind tunnel, and the configuration has been described in U.S. Pat. No. 3,604,661. But subsequent experiments on suction laminar flow control for a buoyant body propelled in the ocean have demonstrated inadequate laminarization. It is hypothesized that the suction laminar flow control ocean vehicle captured ocean particles at the slot entrance in the low speed regime, and that the captured ocean particles remained in the slots, protruding into the boundary layer, and thus caused transition to turbulent boundary layer flow. It is known from subsequent experiments that, as the speed progresses, a speed is reached above which no ocean particles can be captured by the flush slots because forces on the particles and the momentum of the particles sweep them on downstream past the slots. In the low speed regime, however, backflush (blowing rather than suction through the slots) is required to prevent the capture of ocean particles. Thus, a system is required that will provide backflush in the vehicle low speed range of zero to approximately one fifth the vehicle "maximum" speed, and at the same time providing thrust to accelerate the vehicle. Such a system is the subject of the present invention.

SUMMARY OF THE INVENTION

Accordingly, the present invention provides an underwater vehicle which integrates backflushing apparatus and a boundary layer control mechanism with main and auxiliary pumps. The vehicle includes nose and tail portions on an elongate body having surface skin apertures disposed therein along its length. An auxiliary pump, located in the nose or tail portions upstream of the apertures, communicates the vehicle interior with the ambient fluid through the body to propel the vehicle from a position of rest, relative to the ambient fluid, to a predetermined low speed. In that range of speed, the main pump is inoperative, and a portion of the fluid from the auxiliary pump is directed through a nozzle at the tail portion, while the remainder of the fluid escapes through the surface apertures in the form of a backflush so that ocean particles cannot be captured by the slots. When the vehicle reaches a predetermined critical speed, the auxiliary pump is inactivated, the backflush intake valve is closed, and the main pump is switched on. Ambient fluid, previously entering through the nose, for example, is now drawn in through the surface apertures so that the backflush becomes intake or suction. Thus, at speeds greater than the backflush speeds, the main pump assumes its normal role of providing suction for laminar flow control and thrust for vehicle propulsion.

OBJECTS OF THE INVENTION

Accordingly, it is an object of the present invention to provide apparatus in a suction laminar flow control undersea vehicle which simultaneously produces backflush through body apertures and relatively low speed propulsion.

Another object of this invention is to provide an underwater craft with body apertures which function as backflush openings during low speed operation of the craft and fluid suction openings for laminar flow control during medium and high speed operation of the craft.

BRIEF DESCRIPTION OF THE DRAWINGS

A more complete understanding of the above objects, as well as many of the attendant advantages of this invention, will be readily appreciated as the same becomes better understood by the reference to the following detailed description when considered in connection with the accompanying drawings.

FIG. 2 is an enlarged cross-sectional view of a forward portion of the vehicle showing details of the invention.

FIG. 3 is a schematic representation of an alternate embodiment of auxiliary pump location.

DETAILED DESCRIPTION OF THE INVENTION

Figure 1:
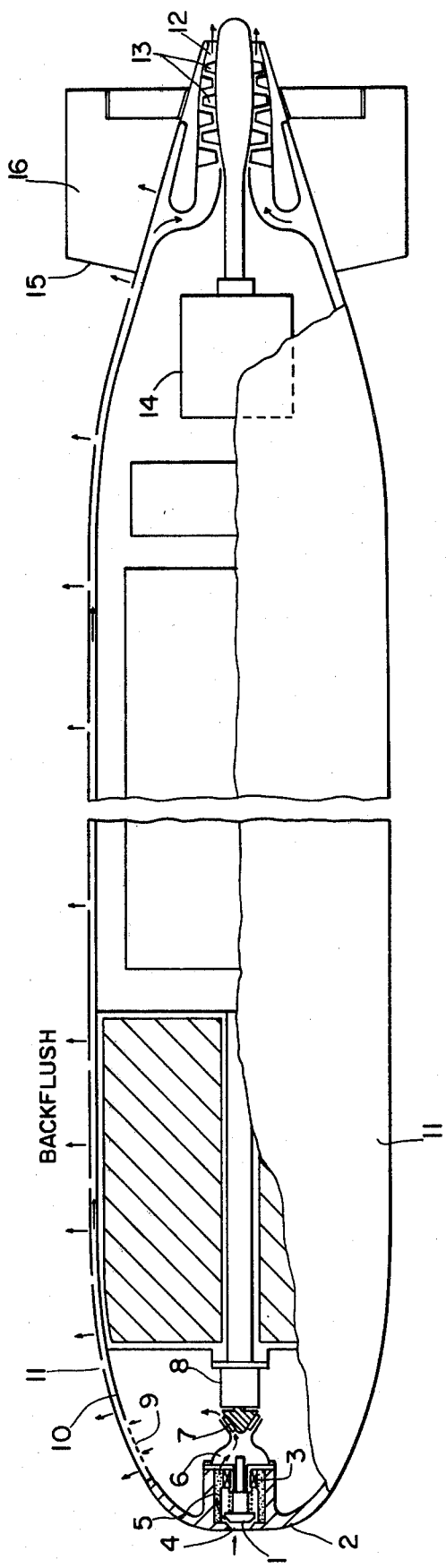
FIG. 1 is a side view in partial cross-section of an underwater vehicle to which the present invention is applied.

Referring now to the drawings, FIGS. 1 and 2 show the novel underwater suction laminar flow control vehicle which includes a backflush system used in conjunction with its own propulsion. Inlet valve 1, located in nose 2 of the vehicle, when activated by solenoid 3, opens to permit flow of ambient seawater through inlet 4, filter 5, adapter chamber 6, to centrifugal pump 7 driven by motor 8.

The ambient seawater is sucked into inlet 4 and subsequently to pump 7. The flow leaving pump 7, now having increased pressure, passes through perforations 9 into longitudinally extending, circumferentially disposed suction duct passage 10. As a result of this flow being pressurized, part of it passes out through surface apertures 11 of the vehicle as backflush, while the remainder of the flow passes through vehicle exit nozzle 12, thus providing very low speed propulsion. During the start and very low speed stages of operation, rotors 13 (main pump) and driving motor 14 of the main propulsion system do not operate.

The vehicle accelerates under the propulsion force of the flow emanating from nozzle 12. When a predetermined speed is reached, a signal, generated by a speed sensor 30 located somewhere on the body, is transmitted to motor 8 which is switched off, valve 1 is closed, and main propulsion motor 14 is switched on. The vehicle then begins its second or normal laminar flow control mode of operation in which rotor 13, as a result of its downstream location relative to surface apertures 11, generates low pressure on its upstream side thereby pulling ambient fluid into suction duct passage 10. The direction of flow of ambient fluid through apertures 11 thereby reverses so that backflush effectively becomes suction, and fluid is exhausted from exit nozzle 12 for high speed propulsion of the vehicle.

There has, therefore, been described one embodiment of the invention comprising main and auxiliary pumps and valving for the purpose of providing in a suction laminar flow control vehicle starting propulsion and backflush as well as high speed propulsion and a laminar boundary layer control device. In a first mode of operation, seawater entering the nose of the vehicle is pumped not only through the tail to generate low speed propulsion, but also through side wall apertures to prevent the capture of ocean particles that could lodge and cause transition to turbulent flow. In a second or laminar flow control mode of operation, the entrance in the nose is blocked off and seawater is sucked in the side wall apertures and expelled through exit nozzle 12 by a rearwardly placed main pump 13 activated when the nose entrance is closed. The system, when used in the second mode of operation, provides laminar boundary layer flow over the vehicle's outer surface with attendant drastic reductions in frictional drag and propulsion power required.

An alternate sequence of operations for the backflush regime, requiring less power from the auxiliary pump, is described as follows. In the alternate sequence, at a selected intermediate speed within the backflush regime, auxiliary pump 7 is switched off, inlet valve 1, remains open, and the natural pressure difference between the nose stagnation zone at inlet 4 and the slots 11 of the vehicle body provides the backflush. At the moment auxiliary pump 7 is switched off, motor 14 of main pump 13 is switched on to provide propulsion. The vehicle continues to accelerate in the backflush mode, and when the critical speed is reached, inlet valve 1 is closed and the backflush changes to suction, thereby initiating the laminar flow control operation in which water is drawn in through slots 11 and ejected at outlet or exhaust port 12.

High pressure (stagnation) zones suitable for backflush inlets may be located at the leading edge 15 of tail fins 16 as well as at the center of the vehicle nose. These inlets, whether in the nose or leading edges of the tail fins, are on leading or frontal portions of the vehicle located in high pressure zones during forward travel of the vehicle. An embodiment with the inlet located in a tail fin and first or auxiliary pump means located in the tail of aft of the vehicle is illustrated somewhat schematically in FIG. 3. In some vehicle configurations it may be desirable to supplement backflush valve 4 and auxiliary pump 7 combination at the vehicle nose with one or more similar combinations in the tail. As shown in FIG. 3, aft inlet 18, which may be provided with a controlled inlet valve and arrangement (not shown) similar to that disclosed in FIGS. 1 and 2, is located in leading edge 15 of tail fin 16. An aft auxiliary pump 20 is located anywhere in the tail region, with its outlet 22 in combination with the aft region of the suction ducting or passages 10. It operates in much the same manner as pump 7 located in the nose.

Obviously, many modifications and variations of the present invention are possible in light of the above teachings. It is therefore to be understood that the invention is defined only by the scope of the appended claims.

What is claimed is:

1. In an underwater vehicle having an elongate body including a nose portion and a rear portion including tail fins wherein the improvement resides in providing suction laminar flow control for the outer surface thereof comprising:

water inlet means in a frontal portion and water exhaust exit nozzle means in a rear portion of the vehicle;

apertures about the body in communication with the water;

first pump means selectively operative for drawing water through the inlet means and exhausting a portion thereof out through the body apertures for backflushing the apertures and exhausting the remaining portion out through the exit nozzle means for low speed forward propulsion of the vehicle;

second pump means selectively operative for drawing water in through the body apertures and exhausting it out through the exit nozzle means for high speed forward propulsion of the vehicle;

whereby upon operation of the second pump means water drawn into the apertures induces a laminar flow of water adjacent the body for reduced drag on the vehicle.

2. The invention according to claim 1 wherein the inlet means is selectively opened and closed.

3. The invention according to claim 1 wherein the inlet means is open below a predetermined forward vehicle speed and closed above the predetermined speed.

4. The invention according to claim 1 wherein the second pump means has a higher capacity than the first pump means.

5. The invention according to claim 1 wherein means responsive to forward speed of the vehicle deenergizes the first pump means and energizes the second pump means.

6. The invention according to claim 1 wherein the water inlet means is located in the nose of the vehicle.

7. The invention according to claim 6 wherein the first pump means is located adjacent the nose of the vehicle.

8. The invention according to claim 1 wherein the water inlet means is on a frontal portion in the nose of the vehicle.

9. The invention according to claim 1 wherein the water inlet means is located in a frontal portion of a tail fin of the vehicle.

10. The invention according to claim 9 wherein the first pump means is located aft of the vehicle.

11. The invention according to claim 1 wherein first pump means and water inlet means are located in both the nose and tail fin of the vehicle.

12. In an underwater vehicle having an elongate body including a nose portion and a rear portion including tail fins, means providing backflushing and propulsion at low speeds and providing suction laminar flow control for the outer surface thereof at high speeds comprising:

water inlet means in a frontal portion and water exhaust exit nozzle means in a rear portion of the vehicle;

apertures about the body in communication with the water;

first pump means selectively operative for drawing water through the inlet means and exhausting a portion thereof out through the body apertures for backflushing the apertures and exhausting the remaining portion out through the exit nozzle means for low-speed forward propulsion of the vehicle, said first pump means further including valve means and means for opening and closing said valve means, said valve means being opened for low-speed operation of the vehicle and closed for high-speed operation;

second pump means selectively operative for drawing water in through the body apertures and exhausting it through the exit nozzle means for high-speed forward propulsion of the vehicle;
vehicle speed sensing means connected to deenergize the first pump means and energize the second pump means at a preselected vehicle speed;
whereby upon operation of the second pump means water drawn into the apertures induces a laminar flow of water adjacent the body for reduced drag on the vehicle.

* * * * *